US012649375B2

(12) United States Patent (10) Patent No.: US 12,649,375 B2
Lambert et al. (45) Date of Patent: Jun. 9, 2026

(54) BIDIRECTIONAL CHARGING SYSTEM FOR ELECTRIC VEHICLE

(71) Applicant: HYDRO QUÉBEC, Ouébec (CA)

(72) Inventors: Ghislain Lambert, Saint-Mathieu de Beloeil (CA); Samuel Lavoie, Ste-Julie (CA); Éric Lecourtois, Shawinigan (CA); Angelo Giumento, Ville St-Laurent (CA); Marin Lagace, St-Bruno de Montarville (CA); Jean-Luc Dupre, Saint-Eustache (CA); Louis-André Patault, Montréal (CA); Nacer Boudjerida, Brossard (CA); Karim Zaghib, Longueuil (CA); Éric Perreault, Carignan (CA); Philippe Venne, Saint-Basile-le-Grand (CA)

(73) Assignee: HYDRO QUÉBEC, Montreal (CA)

( * ) Notice: Subject to any disclaimer, the term of this patent is extended or adjusted under 35 U.S.C. 154(b) by 0 days.

(21) Appl. No.: 15/307,255

(22) PCT Filed: Apr. 29, 2015

(86) PCT No.: PCT/CA2015/050356
§ 371 (c)(1),
(2) Date: Oct. 27, 2016

(87) PCT Pub. No.: WO2015/164967
PCT Pub. Date: Nov. 5, 2015

(65) Prior Publication Data
US 2017/0050529 A1 Feb. 23, 2017

(30) Foreign Application Priority Data

Apr. 29, 2014 (CA) ................................ CA 2850683
Apr. 29, 2014 (CA) ................................ CA 2850684
(Continued)

(51) Int. Cl.
B60L 53/14 (2019.01)
B60L 53/63 (2019.01)
(Continued)

(52) U.S. Cl.
CPC ............... B60L 53/14 (2019.02); B60L 53/63 (2019.02); B60L 55/00 (2019.02); B60L 58/12 (2019.02);
(Continued)

(58) Field of Classification Search
CPC ...................................................... B60L 55/00
See application file for complete search history.

(56) References Cited

U.S. PATENT DOCUMENTS

2006/0244411 A1 11/2006 Wobben
2008/0136371 A1* 6/2008 Sutardja .................. B60L 58/15
320/109
(Continued)

FOREIGN PATENT DOCUMENTS

CN 101828318 A 9/2010
CN 102778866 A * 11/2012 ............. B60L 53/65
(Continued)

OTHER PUBLICATIONS

CN-102778866-A translation (Year: 2012).*
(Continued)

*Primary Examiner* — Tynese V Mcdaniel
(74) *Attorney, Agent, or Firm* — Womble Bond Dickinson (US) LLP

(57) ABSTRACT
A bidirectional charging system for an electric vehicle including a bidirectional terminal connected to the electrical network, a cable for connection to an electric vehicle, a control panel accessible from the terminal and a means of communication to the control system of the electrical network, the vehicle includes a bidirectional charger, said
(Continued)

Charge and V2G bidirectional charger allows the transfer of electrical energy from the terminal to the battery of the vehicle and vice versa, wherein the user of said vehicle can specify the minimum level of charge of the battery through the terminal of the control panel.

23 Claims, 4 Drawing Sheets

(30) Foreign Application Priority Data

Apr. 29, 2014  (CA) ................................. CA 2850718
Apr. 29, 2014  (CA) ................................. CA 2850726

(51) Int. Cl.
  *B60L 55/00*      (2019.01)
  *B60L 58/12*      (2019.01)
  *H02J 7/00*       (2026.01)
  *H02J 7/42*       (2026.01)
  *H02J 7/82*       (2026.01)
(52) U.S. Cl.
  CPC ............... *H02J 7/82* (2026.01); *H02J 7/865*
      (2026.01); *B60L 2250/12* (2013.01); *H02J*
      *7/42* (2026.01); *Y02E 60/00* (2013.01); *Y02T*
      *10/70* (2013.01); *Y02T 10/7072* (2013.01);
      *Y02T 90/12* (2013.01); *Y02T 90/14* (2013.01);
      *Y02T 90/16* (2013.01); *Y04S 10/126* (2013.01)

(56) References Cited

U.S. PATENT DOCUMENTS

| | | | | |
|---|---|---|---|---|
| 2009/0030712 | A1* | 1/2009 | Bogolea | B60L 11/1816 |
| | | | | 705/1.1 |
| 2010/0076825 | A1 | 3/2010 | Sato et al. | |
| 2010/0310922 | A1* | 12/2010 | Villarreal | H01M 50/503 |
| | | | | 429/160 |
| 2010/0314942 | A1* | 12/2010 | Talkin | H02J 3/144 |
| | | | | 307/41 |
| 2011/0202192 | A1 | 8/2011 | Kempton | |
| 2011/0202418 | A1* | 8/2011 | Kempton | B60L 11/1824 |
| | | | | 705/26.1 |
| 2011/0245987 | A1* | 10/2011 | Pratt | H01M 10/44 |
| | | | | 700/295 |
| 2011/0254494 | A1* | 10/2011 | Briane | H02J 7/02 |
| | | | | 318/503 |
| 2011/0259656 | A1* | 10/2011 | Lacour | |
| 2012/0065805 | A1* | 3/2012 | Montalvo | G06Q 10/06 |
| | | | | 700/297 |
| 2012/0249068 | A1 | 10/2012 | Ishida | |
| 2013/0020139 | A1* | 1/2013 | Kim | B60K 1/04 |
| | | | | 180/68.5 |
| 2013/0162025 | A1* | 6/2013 | Momose | B60L 11/1862 |
| | | | | 307/9.1 |
| 2013/0169220 | A1* | 7/2013 | Karner | H02J 7/0027 |
| | | | | 320/108 |
| 2013/0175990 | A1 | 7/2013 | Jung et al. | |
| 2014/0103860 | A1* | 4/2014 | Kominami | H02M 1/32 |
| | | | | 320/103 |
| 2014/0103866 | A1* | 4/2014 | Kothavale | H02J 7/0027 |
| | | | | 320/108 |

| | | | | |
|---|---|---|---|---|
| 2014/0132202 | A1* | 5/2014 | Kam | H02J 7/0069 |
| | | | | 320/149 |
| 2014/0217976 | A1 | 8/2014 | Mcgrath et al. | |
| 2014/0333261 | A1* | 11/2014 | Oh | B60L 11/1827 |
| | | | | 320/109 |
| 2014/0347017 | A1* | 11/2014 | Sugano | B60L 1/003 |
| | | | | 320/137 |
| 2014/0347018 | A1* | 11/2014 | Boblett | B60L 11/1838 |
| | | | | 320/162 |
| 2014/0354240 | A1 | 12/2014 | Wang et al. | |
| 2015/0217656 | A1* | 8/2015 | Loftus | H02J 7/0065 |
| | | | | 320/136 |
| 2015/0270744 | A1* | 9/2015 | Lacarnoy | H02J 9/061 |
| | | | | 307/66 |

FOREIGN PATENT DOCUMENTS

| | | |
|---|---|---|
| CN | 102844957 A | 12/2012 |
| CN | 103079867 A | 5/2013 |
| CN | 103580250 A | 2/2014 |
| CN | 103597725 A | 2/2014 |
| EP | 2 602 900 A1 | 6/2013 |
| FR | 2 992 779 A1 | 1/2014 |
| JP | 2003265538 A | 9/2003 |
| JP | 2007534281 A | 11/2007 |
| JP | 2010081722 A | 4/2010 |
| JP | 2010285058 A | 12/2010 |
| KR | 10-2007-0091231 | 9/2007 |
| WO | 2009/014543 A1 | 1/2009 |
| WO | 2011/077780 A1 | 6/2011 |
| WO | 2011/103249 A2 | 8/2011 |
| WO | WO2013/055830 A1 | 4/2013 |
| WO | 2013097824 A1 | 7/2013 |

OTHER PUBLICATIONS

International Search Report (PCT/ISA/210) issued on Jul. 27, 2015, by the Canadian Patent Office as the International Searching Authority for International Application No. PCT/CA2015/050356.

Written Opinion (PCT/ISA/237) issued on Jul. 27, 2015, by the Canadian Patent Office as the International Searching Authority for International Application No. PCT/CA2015/050356.

The extended European Search Report issued on Mar. 29, 2018, by the European Patent Office in corresponding European Patent Application No. 15786538.7-1220. (11 Pages).

Office Action (Notification of the First Office Action) issued on Jul. 4, 2018, by the State Intellectual Property Office of the People's Republic of China in corresponding Chinese Patent Application No. 201580023483.X, and an English Translation of the Office Action. (27 pages).

Office Action (Notice of Reasons for Rejection) issued on Feb. 4, 2019, by the Japanese Patent Office in corresponding Japanese Patent Application No. 2016-564338, and an English Translation of the Office Action. (11 pages).

Official Action issued on May 4, 2021 by the Canadian Patent Office in corresponding Canadian Patent Application No. 2,946,204 (9 pages, with machine translation).

Official Action issued on Jun. 1, 2021 by the South Korean Patent Office in corresponding South Korean Patent Application No. 2016-7029530 (12 pages, with machine translation).

Office Action dated Feb. 16, 2024, in South Korean application No. 10-2022-7023411.

Office Action Sep. 3, 2024 in Chinese application No. 202210835840.4.

* cited by examiner

Charge and V2G

V2H

Agregator

Vehicle with bidirectional charger

BIDIRECTIONAL CHARGING SYSTEM FOR ELECTRIC VEHICLE

CROSS REFERENCE TO RELATED APPLICATIONS

The present application is a U.S. National Stage of International Application No. PCT/CA2015/050356, filed on Apr. 29, 2015, which claims the benefit of Canadian Application No. 2,850,718, filed on Apr. 29, 2014, Canadian Application No. 2,850,684, filed on Apr. 29, 2014, Canadian Application No. 2,850,683, filed on Apr. 29, 2014, and Canadian Application No. 2,850,726, filed on Apr. 29, 2014. The entire contents of each of International Application No. PCT/CA2015/050356, Canadian Application No. 2,850,718, Canadian Application No. 2,850,684, Canadian Application No. 2,850,683, and Canadian Application No. 2,850,726 are hereby incorporated herein by reference in their entirety.

FIELD OF THE INVENTION

The present invention relates to a bidirectional charging system for electric vehicle.

BACKGROUND OF THE INVENTION

Typically, electric vehicles (for example, battery powered vehicles and "plug-in" hybrid vehicles) are charged in a manner similar to those used to charge devices powered by rechargeable batteries. In other words, the operator connects the connector of the terminal to the vehicle receptacle provided for that purpose. The charger, which is installed in the vehicle, immediately starts charging the battery of the vehicle. This charger is unidirectional, that is to say that the load is in the direction of the vehicle. The speed at which the vehicle battery is charged is usually the result of the current limit imposed by the electronics of the charger and the capacity of the terminal. The charger of a vehicle may contain explicit logic or components to modify the charge rate in order to prolong the life of the vehicle battery. Generally, there are no additional components for controlling the charging rate, which is determined by other factors.

Moreover, in the context of rechargeable electric vehicles, it is known the use of bidirectional chargers located in the charging terminal. In this case, the electric vehicle contains no charger and the battery of the vehicle is directly connected to the bidirectional charger located in the external charging terminal.

OBJECT OF THE INVENTION

A first object of the present invention is to provide a bidirectional charging system for electric vehicle, comprising a bidirectional terminal connected to the electrical network, an electric vehicle adapted to be connected to the terminal, a control panel accessible from terminal and a means of communication to the control system of the electrical network, said vehicle including a bidirectional charger, said bidirectional charger allowing to transfer electrical energy from the terminal to the vehicle battery and vice versa, wherein the user of said vehicle can specify the minimum charge level of the battery via the control panel of the terminal.

A second object of the present invention is to provide a bidirectional charging system for electric vehicle, comprising a bidirectional terminal connected to the electrical network, an electric vehicle adapted to be connected to the terminal, an electric power output to power critical loads and a control panel accessible from the terminal, a bidirectional charger for transferring electrical power from the terminal to the vehicle battery and conversely, wherein the user can accept or refuse that the energy of the vehicle be used to power critical loads when the main power of the electrical network is not available.

A third object of the present invention is to provide a bidirectional charging system for electric vehicle, comprising a bidirectional terminal connected to the electrical network, an electric vehicle adapted to be connected to the terminal and a means of communication with the control system of the electrical network, said vehicle including a bidirectional charger, said bidirectional charger enabling the transfer of electrical energy from the terminal to the vehicle battery and vice versa, wherein the control system modulates the power supplied to and withdrawn to the vehicle according to the network needs.

A fourth object of the present invention is to provide an electric vehicle comprising an electric propulsion system with a central motor and vehicle control system, wherein the vehicle includes a bidirectional charger and a LiFePo4 battery.

In some embodiments, the bidirectional terminal is communicatively connected to, and configured to separately communicate with, both the bidirectional charger and a control system of the electrical network. In some embodiments, the bidirectional charger is electrically and communicatively connected to the bidirectional terminal via a wired connection that extends between the charging socket of the electric vehicle and the bidirectional terminal.

Other objects, features and advantages of the present invention will become more apparent in view of the following description of possible embodiments, given as examples only in relation to the following figures.

DESCRIPTION OF EMBODIMENTS OF THE INVENTION

Figure 1:
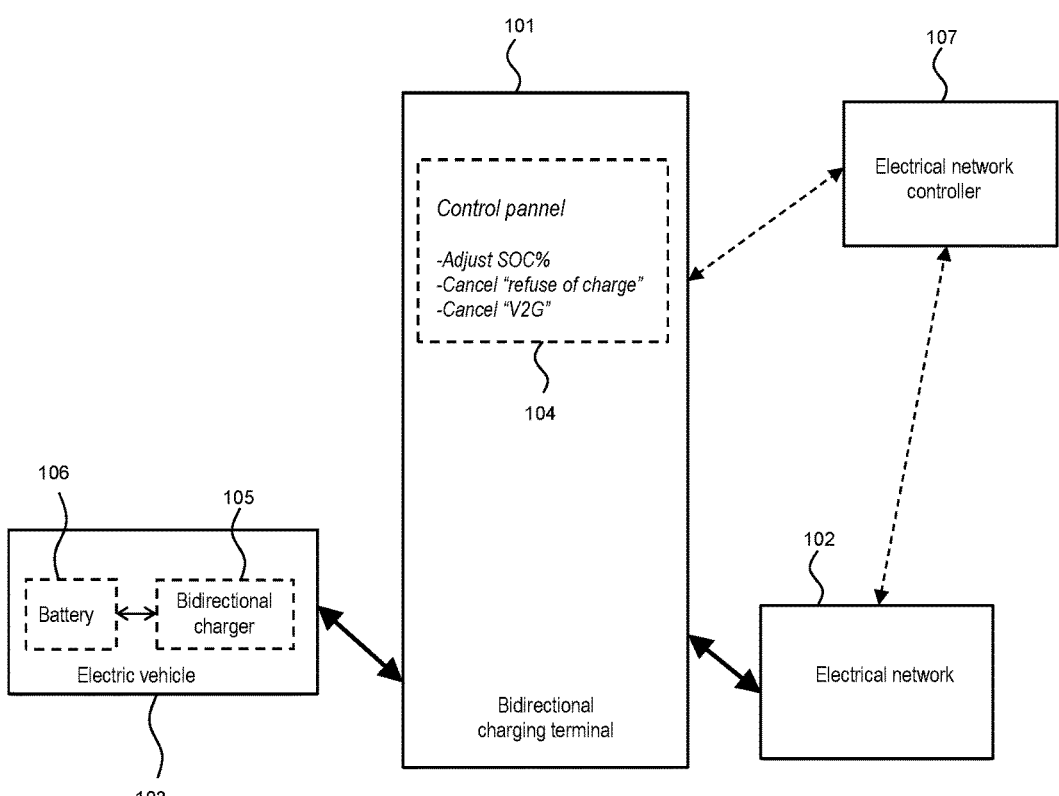
FIG. 1 is a schematic diagram showing a bidirectional charging system for electric vehicle, according to a preferred embodiment of the present invention.

Referring to FIG. 1, there is shown a bidirectional charging system for electric vehicle comprising a bidirectional terminal 101 connected to the electrical network 102. The electric vehicle 103 is connected to terminal 101 via a cable. The system includes a control panel 104 accessible from the terminal 101 and a means of communication to the control system of the electrical network 107. The vehicle includes a bidirectional charger 105, which is different from known vehicles that do not contain one or contain a unidirectional charger. The bidirectional charger 105 allows the transfer of electrical energy from the terminal 101 to the battery 106 of the vehicle and vice versa. The user of the vehicle can specify the minimum level of charge (SOC % or "State of Charge") of the battery 106 via the control panel 104 of the terminal 101.

The bidirectional charger 105 allows the exchange of electrical energy between the electric vehicle 103 and the electrical network 102. In the context of a "vehicle-to-grid (V2G)" system, electric vehicles (EV) automatically communicate with the electrical network 102 to sell surplus power or to decrease the charge rate. Such system aims to use the energy stored in the batteries of electric vehicles (EVs) as an auxiliary source to supply electricity to the electrical network 102, for example, during periods of peak demand.

The bidirectional charger 105 also allows the battery of the electric vehicle 103 to directly power the main circuit of a house during power failures (commonly called "vehicle-to-home" or V2H). This allows the owner of the electric vehicle (EV) to use the energy stored in the vehicle battery as a temporary source of electricity for his home, similarly as achieved by a generator.

The main advantage of the bidirectional charger 105 which is integrated with the electric vehicle 103 is having an alternating voltage power source (AC) at any time without requiring the need for a particular terminal. In fact, when the bidirectional charger 105 is integrated to the vehicle 103, one simply needs to communicate with it so that it delivers the power to the charging socket of the vehicle 103. This feature is allowed only in an isolated network.

Road tests carried out between July-August 2013 allowed to evaluate a number of characteristics of an electric vehicle with 96 km of autonomy in summer conditions. Table 1 below shows the test results.

| Date | SOC % Start | Distance (km) | SOC % Arrival | Batt. Temp. (° C.) |
|------|-------------|---------------|---------------|--------------------|
| Jul. 31, 2013 | 97 | 21.1 | 72.2 | 28 |
| Jul. 31, 2013 | 84.6 | 22.5 | 63 | 32 |
| Aug. 1, 2013 | 82.7 | 21.4 | 60.8 | 30 |
| Aug. 1, 2013 | 79.7 | 25 | 54.7 | 32 |
| Aug. 5, 2013 | 76.6 | 21.4 | 52.2 | 22 |

Therefore, for example, the user can specify the minimum level of charge (SOC %) of the battery 106 via the control panel 104 of the terminal 101, which may be between 0% and 60% of a maximum charge of the battery 106. The minimum level of charge (SOC %) would correspond to the start level of charge in the above table and would result in a reduction in the distance that the vehicle could be able to travel, but would give the user the ability to sell the energy stored in the battery 106 to the manager of the electrical network 102.

In practice, the user can adjust the minimum level of charge as desired, according to his own needs. The minimum level of charge is also called the critical threshold: it is the percentage % of battery charge that the user wants to keep in his car. For example, if the user knows that he does not use his car before the next afternoon, he may set the threshold at 10%, then the next morning, he can set it at 50% because he needs to leave in the afternoon and will require half of the autonomy offered by his battery.

In charging mode, the bidirectional charger 105 converts the alternating current voltage (AC) to direct current voltage (DC). In V2G/V2H mode, the bidirectional charger 105 converts the direct current voltage (DC) into alternating current voltage (AC). The bidirectional charger 105 is located under the vehicle 103 near the powertrain.

As explained above, the electrical network 102 can make energy requests automatically to the terminal 101 via the controller of the electrical network 107, particularly during consumption peaks. The terminal 101 can be programmed through the control panel 104 so that the terminal 101 automatically accepts a request to refuse charging. Therefore, when the controller of the electrical network 107 determines, for example, that the network needs an energy boost, it sends a request to refuse charging message to the terminal 101 and the terminal 101 automatically stops charging the battery 106 of the vehicle 103. This configuration may allow the user of the vehicle 103 to receive a discount or rebate from the manager of the electric network 102.

However, the user can cancel a total recharge limitation controlled by the management control system of the electrical network 107 via the control panel 104 of the terminal. With this option, the user can ensure that the battery 106 is not discharged by the terminal 101 when a request to refuse charging is made, but in return, the user will have no rebate or discount from the manager of the electrical network 102.

Moreover, when the electrical network 102 performs energy requests to the terminal 101 via the controller of the electrical network 107, the user can cancel the transfer of energy request from the vehicle to the electrical network (V2G: "Vehicle to grid") controlled by the control system of the electric network 107 via the control panel 104 of the terminal.

Preferably, the user can adjust the minimum level of charge of the battery of the vehicle as a function of time in a schedule via the control panel 104 of the terminal.

Preferably, the user can impose a level of charge of the battery of the vehicle at a specific time via the control panel 104 of the terminal.

Figure 2:
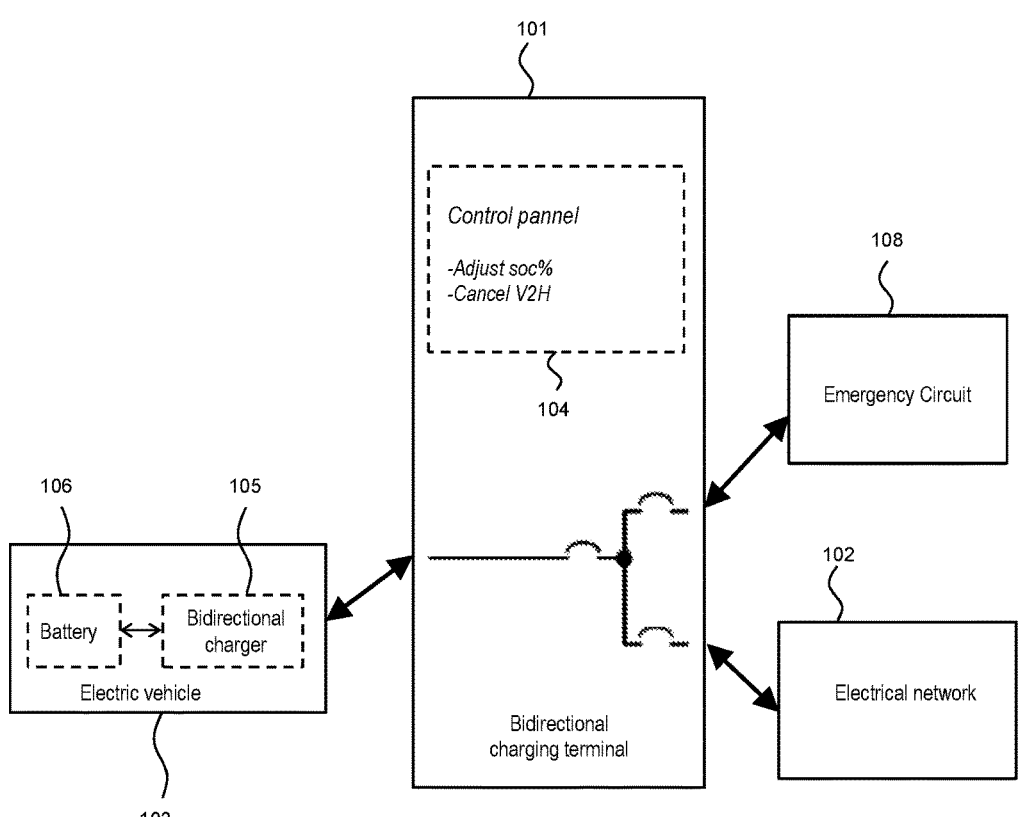
FIG. 2 is a schematic diagram showing a bidirectional charging system for electric vehicle, according to a second preferred embodiment of the present invention.

Referring to FIG. 2, there is shown a bidirectional charging system for electric vehicle comprising a bidirectional terminal 101 connected to the electrical network 102. The electric vehicle 103 is connected to terminal 101 via a cable. The terminal 101 includes an electrical power output for powering critical loads in an emergency circuit 108 and a control panel 104 accessible from the terminal 101. The vehicle may include a bidirectional charger 105, but the bidirectional charger 105 can also be integrated into the terminal 101. The bidirectional charger 105 allows the transfer of electrical energy from the terminal to the battery 106 of the vehicle 103 and vice versa. The user can accept or refuse that the energy of the vehicle be used to power critical loads 108 when the main electrical network 102 is not available.

Thus, the above system can be very useful during a power failure of the electrical network 102 which often results in shedding of various neighbourhoods. In this case, when the user programs the terminal 101 so as to only power critical loads 108, the battery 106 of the vehicle 103 can support a part of the load of a house, for example, the kitchen. Of course, the house can also be a building, a business, an institution, a company, etc.

The V2H ("vehicle-to-home") concept allows mutual sharing of charges between "plug-in" hybrid vehicles, rechargeable electric vehicles and the electric system of a house or dwelling.

Preferably, the user can specify the minimum level of charge of the battery 106 via the control panel of the terminal 104.

Figure 3:
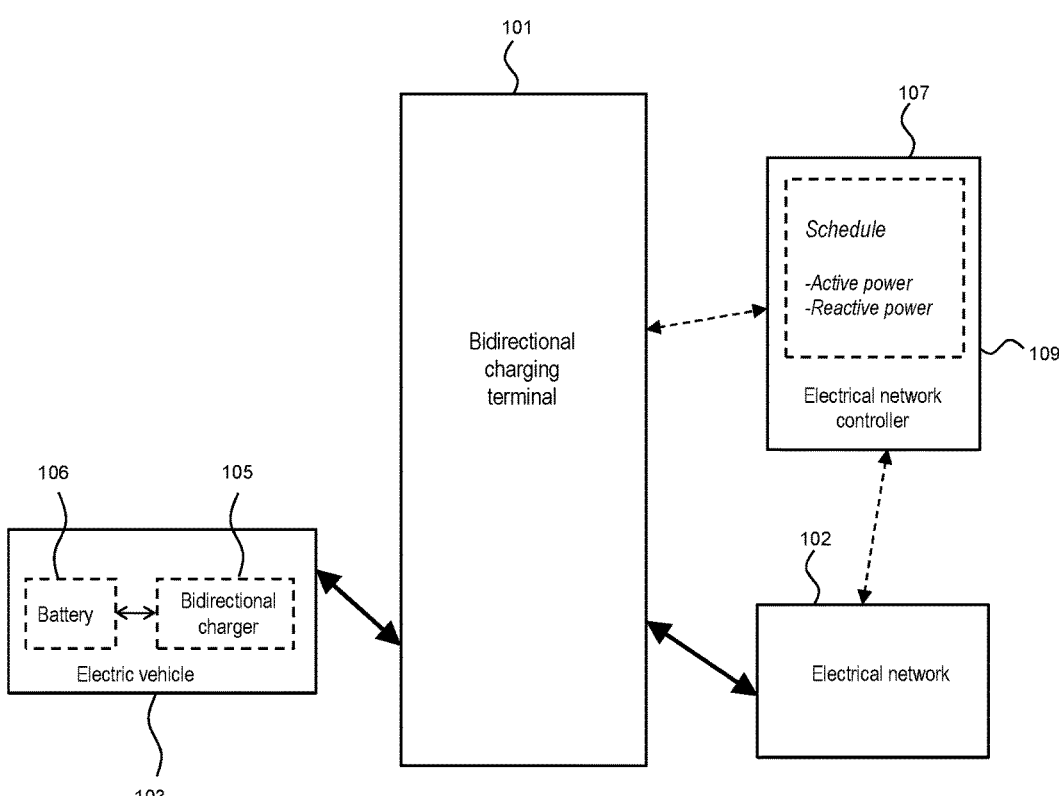
FIG. 3 is a schematic diagram showing a bidirectional charging system for electric vehicle, according to a third preferred embodiment of the present invention.

Referring to FIG. 3, there is shown a bidirectional charging system for electric vehicle comprising a bidirectional terminal 101 connected to the electrical network 102. The electric vehicle 103 is connected to terminal 101 via a cable. The system includes a means of communication to the control system of the electrical network 107. The vehicle includes a bidirectional charger 105. The bidirectional charger 105 allows the transfer of electrical energy from the terminal 101 to the vehicle battery 106 and vice versa. The control system of the electrical network 107 modulates the power supplied to and withdrawn from the vehicle according to the network needs from an event schedule 109 sent to the terminal 101.

Preferably, the modulated power is active and/or reactive.

Figure 4:
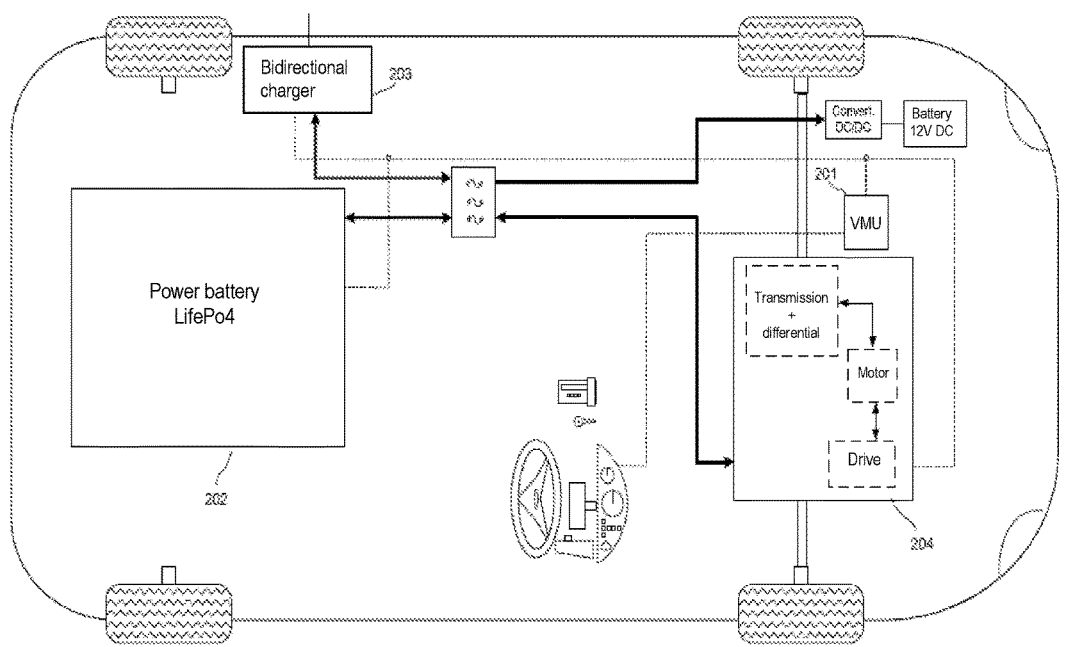
FIG. 4 is a schematic diagram showing a bidirectional charging system for electric vehicle, according to a fourth preferred embodiment of the present invention.

Referring to FIG. 4, there is shown an electric vehicle comprising an electric propulsion system with a central motor 204 and a vehicle control system 201. The vehicle includes a bidirectional charger 203 and a battery 202 LiFePo4.

For example, the power battery 202 may be composed of 108 cells in series of the LiFePO4 type with a total nominal voltage of 346 V, a maximum power of 100 kW and a total energy of 20.7 kWh. The cells are contained and protected by an aluminum casing. The battery 202 is located at the front of the vehicle.

A major challenge in the integration of a power battery in an electric vehicle 202 is to place the volume of the battery 202 and other components required in a limited space while respecting the distribution of mass on its axles. It is important to have an adequate weight distribution in order to maintain a manoeuvrability that is similar to a combustion engine vehicle.

The claims should not be limited in scope by the preferred embodiments illustrated in the examples, but should receive the broadest interpretation that conforms to the specification as a whole.

The invention claimed is:

1. A bidirectional charging system, comprising:
   a bidirectional terminal for connection to an electrical network,
   an electric vehicle for connection to the bidirectional terminal, and
   a control panel accessible from the bidirectional terminal,
   wherein the electric vehicle includes a bidirectional charger and a powertrain, the bidirectional charger permitting a transfer of electrical energy from the bidirectional terminal to a power battery of the electric vehicle and vice versa,
   wherein the bidirectional terminal is communicatively connected to, and configured to separately communicate with, both the bidirectional charger and a control system of the electrical network,
   wherein the bidirectional terminal is configured to receive, from the control system of the electrical network, an event schedule indicating electrical network needs, and the bidirectional terminal is configured to supply power to and withdraw power from the electric vehicle in accordance with the event schedule, and
   wherein the control panel is configured such that a user of the electric vehicle can, via the control panel, specify a minimum level of charge, wherein the minimum level of charge is maintained within the power battery as the bidirectional terminal supplies power to and withdraws power from the electric vehicle in accordance with the event schedule.

2. The bidirectional charging system according to claim 1, wherein the minimum level of charge to be maintained within the power battery is between 0% and 60% of a maximum charge of the power battery.

3. The bidirectional charging system according to claim 1, wherein the bidirectional charging system is configured such that the user can cancel, via the control panel, a limitation of charging of the power battery of the electric vehicle, the limitation of charging being controlled by the control system of the electrical network.

4. The bidirectional charging system according to claim 1, wherein the bidirectional charging system is configured such that the user can cancel, via the control panel, a request received by the bidirectional terminal from the control system of the electrical network to transfer energy from the electric vehicle to the electrical network.

5. The bidirectional charging system according to claim 1, wherein the bidirectional charging system is configured such that the user can adjust, via the control panel, the minimum level of charge to be maintained within the power battery of the electric vehicle as a function of time in a schedule.

6. The bidirectional charging system according to claim 1, wherein the bidirectional charging system is configured such that the user can schedule, via the control panel, a level of charge of the power battery of the electric vehicle at a particular time.

7. The bidirectional charging system according to claim 1, wherein the electric vehicle comprises an electric propulsion system with a central motor and a vehicle control system, and wherein the electric vehicle includes a $LiFePO_4$ power battery.

8. The bidirectional charging system according to claim 7, wherein the $LiFePO_4$ power battery includes a plurality of $LiFePO_4$ battery cells electrically connected in series.

9. The bidirectional charging system according to claim 8, wherein the $LiFePO_4$ power battery comprises total nominal voltage of 346 volts (V), a maximum power of 100 kilowatts (KW), and a total energy of 20.7 kilowatt hours (kWh).

10. The bidirectional charging system according to claim 8, wherein the $LiFePO_4$ power battery comprises an aluminum casing configured to contain and protect the plurality of $LiFePO_4$ battery cells.

11. The bidirectional charging system according to claim 1, wherein the bidirectional charger comprises an inverter, and wherein the bidirectional charger is connected under a rear side of the electric vehicle and electrically connected between a charging socket of the electric vehicle and the power battery of the electric vehicle.

12. The bidirectional charging system according to claim 11, wherein the bidirectional charger is electrically and communicatively connected to the bidirectional terminal via a wired connection that extends between the charging socket of the electric vehicle and the bidirectional terminal.

13. The bidirectional charging system according to claim 1, wherein the bidirectional charger comprises an inverter, and wherein the bidirectional charger is connected under the electric vehicle near the powertrain of the electric vehicle and electrically connected between a charging socket of the electric vehicle and the power battery of the electric vehicle.

14. The bidirectional charging system according to claim 1, wherein the control panel is integrated into and physically accessible from the bidirectional terminal by the user.

15. The bidirectional charging system according to claim 1, wherein the minimum level of charge to be maintained within the power battery is 50% of a maximum capacity of the power battery, such that 50% of the maximum capacity of the power battery is available to the bidirectional terminal for supplying power to and withdrawing power from the electric vehicle in accordance with the event schedule.

16. The bidirectional charging system according to claim 1, wherein the minimum level of charge to be maintained within the power battery is 60% or less of a maximum capacity of the power battery, such that at least 40% of the maximum capacity of the power battery is available to the bidirectional terminal for supplying power to and withdrawing power from the electric vehicle in accordance with the event schedule.

17. A bidirectional charging system, comprising:
a bidirectional terminal connected to an electrical network,
an electric vehicle for connection to the bidirectional terminal,
an electrical power output to power critical loads,
a control panel accessible from the bidirectional terminal,
wherein the electric vehicle includes a bidirectional charger for transferring of electrical energy from the bidirectional terminal to a power battery of the electric vehicle and vice versa,
wherein the bidirectional terminal is communicatively connected to, and configured to separately communicate with, both the bidirectional charger and a control system of the electrical network,
wherein the bidirectional charging system is configured such that a user can accept or refuse, via the control panel, that energy of the electric vehicle be used to power critical loads when main power of the electrical network is not available and is configured such that, when the bidirectional terminal receives a request from the control system of the electrical network to transfer energy from the electric vehicle to the electrical network, the user can cancel the request via the control panel,
wherein the control system of the electrical network modulates an amount of power supplied to and withdrawn from the electric vehicle according to electrical network needs based on an event schedule sent to the bidirectional terminal by the control system of the electrical network, and
wherein the control panel is configured such that a user of the electric vehicle can, via the control panel, specify a minimum level of charge, wherein the minimum level of charge is maintained within the power battery when transferring electrical energy from the electric vehicle to the bidirectional terminal and vice versa.

18. The bidirectional charging system according to claim 17, wherein the electric vehicle comprises an electric propulsion system with a central motor and a vehicle control system, and wherein the electric vehicle includes a LiFePO$_4$ power battery.

19. A bidirectional charging system, comprising:
a bidirectional terminal connected to an electrical network,
an electric vehicle for connection to the bidirectional terminal, and
a control panel accessible from the bidirectional terminal,
wherein the electric vehicle incorporates a bidirectional charger, the bidirectional charger enabling transfer of electrical energy from the bidirectional terminal to a power battery of the electric vehicle and vice versa,
wherein the bidirectional terminal is communicatively connected to, and configured to independently communicate with, both the bidirectional charger and a control system of the electrical network, wherein the control system of the electrical network modulates power transferred to and withdrawn from the electric vehicle by the electrical network according to an event schedule sent to the bidirectional terminal by the control system of the electrical network, and
wherein the control panel is configured such that a user of the electric vehicle can, via the control panel, specify a minimum level of charge, wherein the minimum level of charge is maintained within the power battery as the control system of the electrical network supplies power to and withdraws power from the electric vehicle via the event schedule.

20. The bidirectional charging system according to claim 19, wherein the modulated power includes both active power and reactive power.

21. The bidirectional charging system according to claim 19, wherein the electric vehicle comprises an electric propulsion system with a central motor and a vehicle control system, and wherein the electric vehicle includes a LiFePO$_4$ power battery.

22. A bidirectional charging system, comprising:
an electric vehicle (EV) including a power battery, a power receptacle, and a bidirectional charger electrically connected between the power receptacle and the power battery, wherein the bidirectional charger comprises an inverter configured to convert alternating current (AC) electrical energy received at the power receptacle into direct current (DC) electrical energy to charge the power battery and further configured to convert DC electrical energy from the power battery into AC electrical energy provided to the power receptacle; and
a bidirectional electric vehicle (EV) charging terminal comprising a first connection configured to electrically and communicatively connect to the bidirectional charger of the EV via the power receptacle of the EV, a second connection configured to electrically connect the bidirectional EV charging terminal to an electrical grid and to communicatively connect the bidirectional EV charging terminal to a control system of the electrical grid, and a control panel having a display and a user input integrated into the bidirectional EV charging terminal,
wherein the bidirectional EV charging terminal is configured to receive and implement an event schedule from the control system of the electrical grid instructing the bidirectional EV charging terminal when to provide AC electrical energy to and when to receive AC electrical energy from the bidirectional charger of the EV according to expected electrical demands on the electrical grid, and
wherein the user input of the control panel is configured to enable a user of the EV to specify a minimum level of charge to be maintained in the power battery, wherein the minimum level of charge overrides the instructions of the event schedule while the power battery is below the minimum level of charge.

23. The bidirectional charging system according to claim 22, wherein the AC electrical energy provided to and received from the bidirectional charger of the EV includes both active power and reactive power.

* * * * *